United States Patent [19]
Offenbroich

[11] 3,731,958
[45] May 8, 1973

[54] FASTENING DEVICES

[76] Inventor: Adrian Gottfried Offenbroich, Sodra Forstadsgatan 49, 211 43 Malmo, Sweden

[22] Filed: Apr. 14, 1970

[21] Appl. No.: 133,790

[30] Foreign Application Priority Data

Apr. 15, 1970 Sweden ..............................5104/70

[52] U.S. Cl. ...........287/189.36 H, 52/656, 287/54 C
[51] Int. Cl. ...............................................F16b 7/00
[58] Field of Search ..................287/103, 54 A, 54 B, 287/54 C, 54 E, 20.92 R, 20.92 B, 20.92 C, 20.92 D, 189.36 H, 20.92 E; 52/656, 665, 726, 733, 585

[56] References Cited

UNITED STATES PATENTS

| 3,503,639 | 3/1970 | Taylor | 287/20.92 C |
| 3,579,724 | 5/1971 | Toth | 52/656 X |
| 2,726,357 | 12/1955 | Sachs | 287/20.92 E X |
| 3,104,430 | 9/1963 | Badali | 287/20.92 E |
| 3,249,377 | 5/1966 | Weasler | 287/103 R |
| 3,437,362 | 4/1969 | Offenbroich | 287/20.92 R X |

FOREIGN PATENTS OR APPLICATIONS

| 841,261 | 5/1970 | Canada | 287/54 C |
| 680,025 | 4/1966 | Belgium | 287/189.36 H |
| 1,283,356 | 12/1960 | France | 287/189.36 H |

*Primary Examiner*—Reinaldo P. Machado
*Assistant Examiner*—Wayne L. Shedd
*Attorney*—Beveridge & De Grandi

[57] ABSTRACT

A device for the non-releasable fastening of a tube and a fastening body having a joining member which is adapted to nest in the tube and has at least one longitudinal, recessed or bevelled portion which is permanently deformed upon engagement with a conforming longitudinal projection of the tube.

4 Claims, 3 Drawing Figures

PATENTED MAY 8 1973 3,731,958

INVENTOR:
ADRIAN GOTTFRIED OFFENBROICH by
Beveridge + DeGrandi
Attorneys

FASTENING DEVICES

This invention relates to a device for the non-releasable fastening of a substantially tubular structural part and a fastening body having a joining member.

There have already been suggested several devices for the non-releasable connection of a substantially tubular structural part and a fastening body having a joining member, and in these devices the joining member which is to nest in the tubular structural part is of a cross section conforming to the bore of the tubular structural part. However, such devices suffer from more or less serious drawbacks; they are of complicated construction and therefore expensive in manufacture and/or difficult to handle and do not provide a sufficiently reliable connection for the uses contemplated.

Most generally, devices of this type are used for the erection of various interior decoration arrangements, frames, display stands, tables, etc., but the devices should also permit being used whenever it is desired to connect tubular structural parts together.

It is desired to attain an inexpensive and readily handled, but nevertheless reliable fastening device of aesthetically pleasing appearance, that is, without any disturbing elements on the outer side of the device. Also it is very important to avoid deforming the tubular structural part in such a way that the damage is noticeable on the outer side after connection has been established. In many cases a salient feature of the fastening device is its easy releasability, whereas in other cases the strength and simple assembly of the device are in the first considerations.

The present invention relates to a device of the latter type that for its assembly does not require any manual operations other than forcefully introducing into the tubular structural part the joining member which is to nest in the tubular part, the fastening device having no other visible elements than the central element of the fastening body but being nevertheless extremely strong.

The invention thus relates to a device for the non-releasable fastening of a substantially tubular structural part of rectangular, circular or like basic inner profile and a fastening body of which a joining member is to nest in the tubular structural part and is of a cross sectional shape conforming to the bore of said structural part and is made of a softer material than said structural part. To provide a particularly strong fastening device without the assembly thereof leaving any visible marks on the outer side of the structural part the joining member is provided with at least one longitudinal, recessed or bevelled portion for such nesting engagement with at least one longitudinal projection from the basic inner profile of the tubular structural part that upon assembly of the joining member and the tubular structural part said longitudinal, recessed or bevelled portion is permanently deformed and brought into friction-locking engagement with the projections of the tubular structural part. The dimensioning of the tubular structural part and the joining member is such that their interengagement occurs substantially only at the recessed or bevelled portion and the projection.

If the tubular structural part is a tube of square cross section, which normally is the case, the tube at all four corners thereof can have ribs extending diagonally towards the center of the tube while the joining member which is to nest in the tube can have at all four corners recesses extending diagonally towards the center of said member, or the tube can have at all of its four inner corners oblique surfaces while the joining member which is to nest in the tube can have all four corners bevelled; in this latter case the oblique inner corner surfaces of the tube preferably have serrated profiles.

In a tube of square cross section the forces acting upon the tube will be diagonally divided and in addition the corners will be strengthened, resulting in that no visible marks are made on the outer side of the tube after insertion of the joining member in the tube, in spite of the extremely strong fastening. Also in round tubes it is essential to attain a balancing of the forces in the tube to prevent the formation of visible marks on the outer side of the tube. This can be realized either by providing diametrically opposed projections and recessed or bevelled portions, respectively, preferably four in number, but a uniform distribution at 60° spacings is also conceivable.

With the construction described above no friction will result except at the very points of engagement of the parts. To further facilitate nesting of the joining member in the tube the member can have a conicity of for instance 0.3 mm throughout its length which can be of the order of 5 or 6 cm. To facilitate nesting still more the tube end may be internally bevelled.

Finally, it should be mentioned that the ribs or like projections from the basic inner profile of the tube can have longitudinal serrations or barbs for improved engagement.

The invention will be described more in detail hereinbelow with reference to the accompanying drawings in which.

Figure 1:
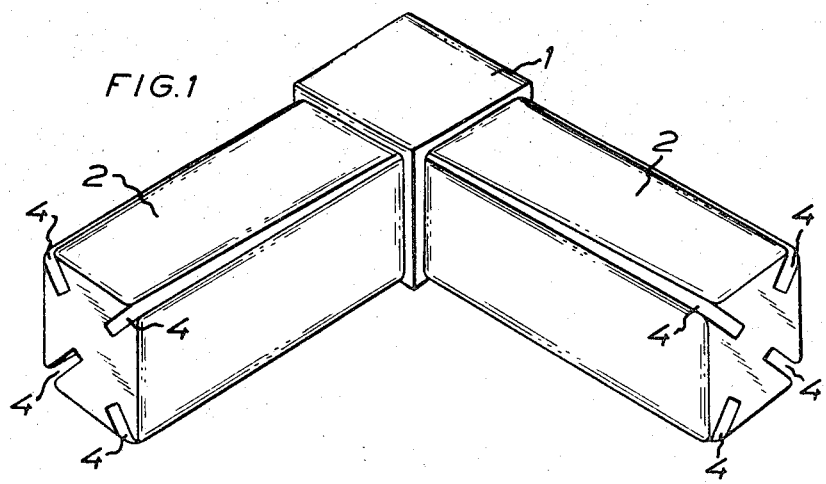
FIG. 1 is a perspective view of the fastening body.

FIG. 1 shows a fastening body comprising a central element 1 (which in the present instance is of cube-shape) and two joining members 2 disposed at right angles to one another and each adapted to nest in a substantially tubular structural part. An optional number of members 2 (a maximum of six with the cube-shape illustrated) can be provided on the central element of the fastening body.

Figure 2:
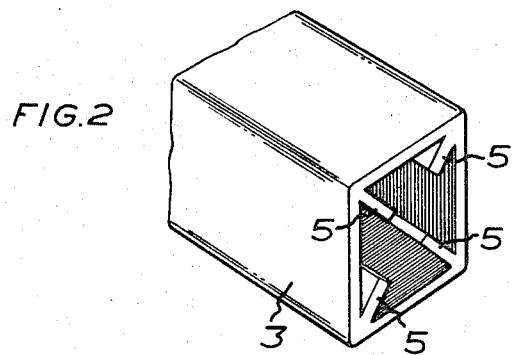
FIG. 2 is a perspective view of a tubular structural part which is to cooperate with the fastening body shown in FIG. 1.

The joining members 2 are of a cross sectional shape conforming to the inner cross sectional shape of substantially tubular structural parts 3 (see FIG. 2). In the embodiment illustrated the tubular structural parts 3 are of square cross sectional shape as are the members 2. The central element 1 of the fastening body is of such a size that a substantially smooth transition is obtained between the various structural parts upon assembly of the fastening and these tubular structural parts.

The joining member 2 shown in FIG. 1, which is adapted to nest in a tubular part has recesses 4 at all four corners, which extend longitudinally of the element and towards the center thereof. These recesses should slightly widen conically in an outward direction and therefore are of a larger width at the free end of the member 2 than at the end associated with the central element 1 to facilitate assembly of the details.

The tube 3 illustrated in FIG. 2 has four longitudinal ribs 5 each extending from one corner of the tube towards the center thereof.

Upon assembly of the tube shown in FIG. 2 and the fastening body shown in FIG. 1, of which at least said body should be manufactured from some elastic or deformable material, such as preferably an aluminum alloy or synthetic plastics, the ribs 5 are inserted in the recesses 4. The initial insertion is easily realized, but owing to the dimensions of the joining member 2 in relation to the tube 3 and particularly the slightly conical shape of the recesses 4 the insertion requires an ever increasing force. When the tube 3 has been inserted up to the central element 1 of the fastening body, the joining member 2 has been moved into a heavy friction-locking engagement with the ribs 5 and deformed in the areas adjoining the recesses 4. This engagement is so heavy that the fastening cannot be released without the greatest difficulty, and the joining member has been deformed at the recesses 4 to such an extent that it cannot be used again.

By suitable dimensioning of the various details it is possible to realize that the engagement between the tube and the fastening body does not produce any visible marks on the outer side of the tube although the tube is suitably made from some aluminum alloy and need have a material thickness of only 1.5 to 2 mm.

Figure 3:
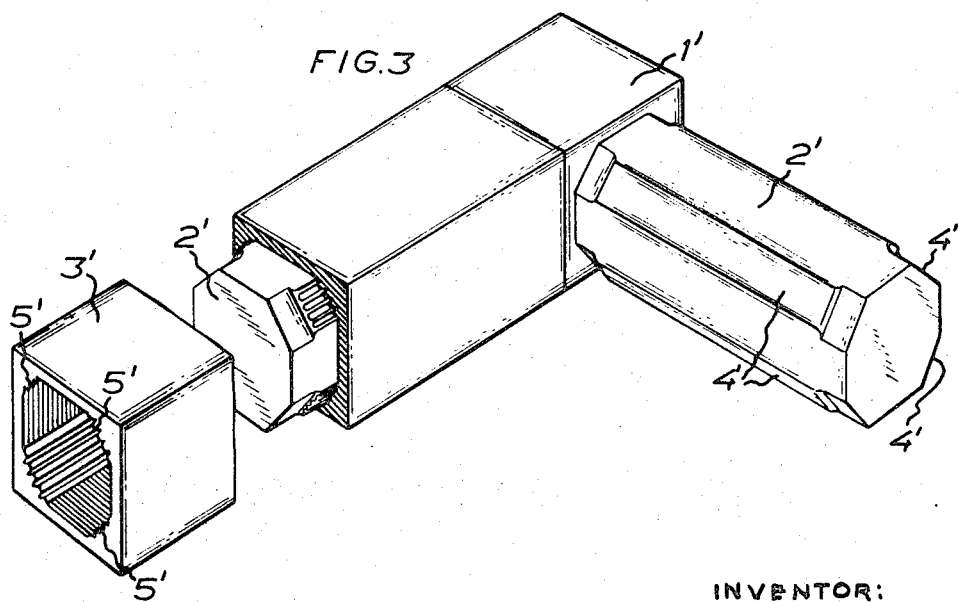
FIG. 3 is a perspective view of a modified embodiment of the fastening body and the tubular structural part cooperating therewith.

The embodiment illustrated in FIG. 3 has great similarities to that shown in FIGS. 1 and 2, for which reason corresponding parts have been given corresponding reference numerals supplemented with a prime mark; thus the central element of the fastening body bears the reference numeral 1', the joining members thereof which are to nest in suitable tubular parts the reference numeral 2' and a tubular structural part the reference numeral 3'.

In this case, however, instead of the discrete recesses 4 there have only been provided bevels 4' at the corners of the joining members 2. The discrete ribs 5 of the tubular part 3 in this case have their counterparts in oblique surfaces 5' at the inner corners of the tube 3'. As will be seen, these oblique surfaces 5' are of serrated cross section, but it should be observed that the desired effect is obtained also without the serrations.

At the insertion of the member 2' in the tube 3' the bevels 4' will be deformed against the oblique surfaces 5', which takes place gradually owing to the conicity of the member 2'. Particularly with serrated oblique surfaces 5' and when the member 2' is made of plastics, it may be difficult initially to insert the member 2' in the tube 3' and material may be scraped off from the bevels 4' at the deformation, thus preventing a complete application of the tube 3' up to the central element 1'. Assembly is much facilitated if the bevels 4' of the member 2' both at the central element 1' and at the end of said member have more pronounced bevels, as illustrated.

Many modifications, of course, are possible within the scope of the invention. Thus it should be stressed that the nesting portions need not be of square cross section; in many cases a circular cross section may be preferred, but other cross sectional shapes are also conceivable. Besides, it should be mentioned that a fastening may be realized in which the tube ends are in direct abutting engagement without any intermediary central element of the fastening body by having the recesses or bevels extend throughout the length of the fastening body and by dispensing with a central element of larger cross section.

What I claim and desire to secure by Letters Patent is:

1. A device for the non-releasable fastening of an elongated, hollow, substantially tubular structural part of substantially uniform inner profile and a fastening body having a joining member which is of a cross sectional shape substantially conforming to that of the bore of the structural part and is made of a softer material than the structural part, said joining member having at least one longitudinally tapered portion and said structural part having at least one corresponding longitudinal projection extending away from the basic profile of the structural part, said portion being adapted to be engaged by said projection in such a way that said portion is permanently deformed to thereby rigidly join said joining member and said structural part upon the longitudinal insertion of said joining member into said structural part.

2. A device as claimed in claim 1, wherein the structural part is a tube of substantially square cross section which at all four corners has ribs extending diagonally inward towards the center of the tube, and the joining member has longitudinally recessed grooves at all four corners, which recessed grooves extend diagonally towards the center of said member in position to telescopingly receive said ribs.

3. A device as claimed in claim 1, wherein the structural part is a tube of substantially square cross sectional shape, which at all four inner corners has oblique surfaces, and the joining member has beveled portions at all four corners in position to engage and deform said oblique surfaces.

4. A device as claimed in claim 3, wherein the oblique inner corner surfaces of the tube, as viewed in cross section, have serrated profiles.

* * * * *